United States Patent
Chang et al.

(10) Patent No.: US 7,163,315 B2
(45) Date of Patent: Jan. 16, 2007

(54) BACKLIGHT MODULE

(75) Inventors: Chih-Li Chang, Tainan (TW); Yung-Li Huang, Taoyuan Hsien (TW)

(73) Assignee: HannStar Display Corporation, Taipei (TW)

( * ) Notice: Subject to any disclaimer, the term of this patent is extended or adjusted under 35 U.S.C. 154(b) by 78 days.

(21) Appl. No.: 10/913,812

(22) Filed: Aug. 6, 2004

(65) Prior Publication Data

US 2005/0168969 A1    Aug. 4, 2005

(30) Foreign Application Priority Data

Feb. 3, 2004    (TW) .............................. 93102435 A

(51) Int. Cl.
*F21V 5/00*    (2006.01)

(52) U.S. Cl. .......................... 362/245; 362/26; 362/97; 362/225; 362/240; 362/241; 362/339

(58) Field of Classification Search ................ 362/100, 362/97, 225, 240, 241, 245, 10, 26, 339
See application file for complete search history.

(56) References Cited

U.S. PATENT DOCUMENTS

| 6,654,088 | B1 | 11/2003 | Morishita et al. ............ 349/113 |
| 2002/0057405 | A1* | 5/2002 | Morishita et al. ............ 349/113 |
| 2003/0058635 | A1* | 3/2003 | Matsui ........................ 362/97 |
| 2004/0233665 | A1* | 11/2004 | West et al. .................. 362/245 |

* cited by examiner

*Primary Examiner*—Stephen F Husar
*Assistant Examiner*—Meghan K. Dunwiddie
(74) *Attorney, Agent, or Firm*—Thomas, Kayden, Horstemeyer & Risley

(57) ABSTRACT

According to the backlight module in the present invention, a plurality of reflective members is used in this module to reflect light from lamps. Each lamp is arranged between any two adjacent reflective members. These reflective members are respectively arranged between any two adjacent lamps. The reflective members can concentrate the light to avoid the generation of shadows in specific regions on the LCD panel.

24 Claims, 3 Drawing Sheets

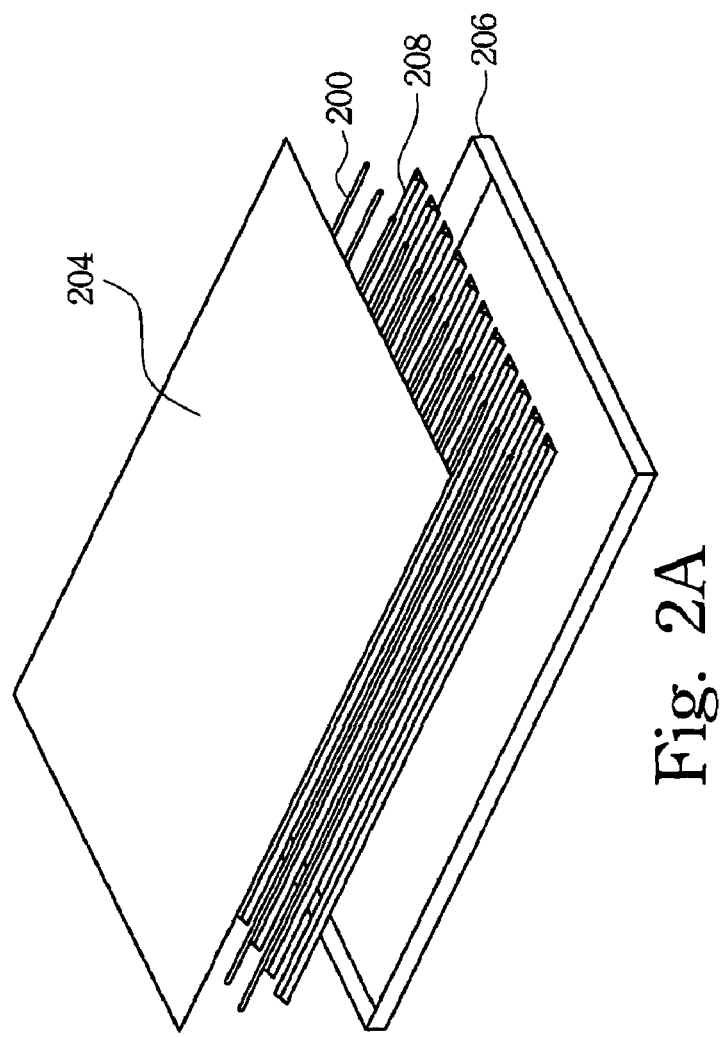
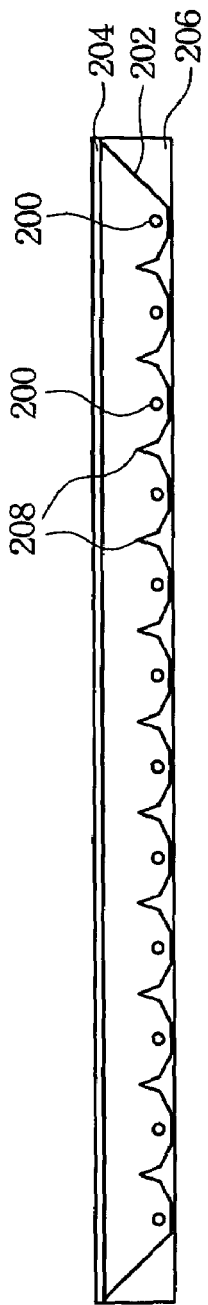
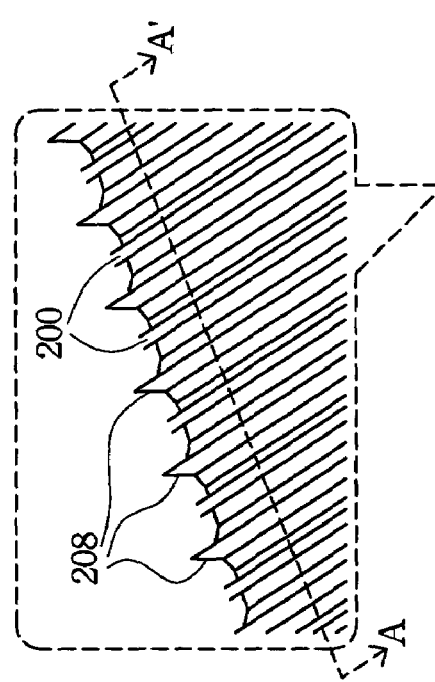
Fig. 2A
Fig. 2B
Fig. 2C

BACKLIGHT MODULE

FIELD OF THE INVENTION

The present invention relates to a liquid crystal display, and more particularly to a liquid crystal display with a direct-light backlight module.

BACKGROUND OF THE INVENTION

Liquid crystal does not emit any light by itself. Therefore, an external light source is required in a liquid crystal display (LCD) module. Typically, a backlight module is used in a transmission liquid crystal display as a light source. Cold cathode fluorescent lamps (CCFL) or light emitting diodes are the light source in a backlight module. High brightness efficiency and long lifetime make the cold cathode fluorescent lamps popular for use in backlight modules.

Light modules usually can be categorized into back type and front type, wherein the back type further includes edge-light light module and direct-light module. The edge-light backlight module can provide an average brightness with an efficiency of about 50%. Moreover, the edge-light backlight module is thin and lightweight. Therefore, it can be used in a portable color LCD. In comparison, the brightness efficiency of the direct-light backlight module is about 60%. However, it is heavier and thicker. Therefore, the direct-light backlight module is always used in LCD monitors and LCD televisions.

Furthermore, when the LCD monitor is larger than 17 inches, the weight of the direct-light backlight module is actually less than the weight of the edge-light backlight module. Therefore, there is the trend to use the direct-light backlight module for large-scale LCD televisions.

Referring to FIG. 1A, a schematic top view of a conventional direct-light backlight module is illustrated. Several cold cathode fluorescent lamps 100 are arranged in parallel to each other so as to provide light to the LCD panel (not shown in this figure). FIG. 1B illustrates a schematic sectional view along the AA' line of FIG. 1A. The light emitted from the CCFLs 100 is reflected by the reflective plate 102. The reflected light is then diffused through the diffuser plate 104 to provide a uniform backlight to the LCD panel. However, the image displayed on the LCD panel is often degraded with what appear to be shadows caused by the presence of the CCFLs arranged underneath the panel. A backlight module that does not cause the shadows on the display is thus required.

SUMMARY OF THE INVENTION

Therefore, the main purpose of the present invention is to provide a backlight module that generates uniform brightness in order to improve the definition of the image shown on the display.

Another object of the present invention is to provide a backlight module. An additional reflective apparatus is used in this module to improve the uniformity of the brightness.

According to the backlight module in the present invention, a plurality of reflective members is used to reflect light from the lamps. These reflective members are respectively arranged between any two adjacent lamps. The reflective members can concentrate the light to avoid shadows that are generated in specific regions on the LCD panel. Each reflective member is composed of a first and a second sidewalls. Each of said sidewalls comprises a first reflective surface of a first elevation and a second reflective surface of a second elevation, and wherein said first elevation is greater than said second elevation and less than 90 degrees.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A illustrates a schematic exploded view of a direct-light backlight module according to the preferred embodiment of the present invention;

FIG. 2B illustrates an enlarged diagram of the reflective members and the CCFLs of FIG. 2A according to the preferred embodiment of the present invention;

FIG. 2C illustrates a schematic cross-sectional view along the AA' line of FIG. 2B of a direct-light backlight module according to the preferred embodiment of the present invention.

DETAILED DESCRIPTION OF THE PREFERRED EMBODIMENT

Figure 1A:
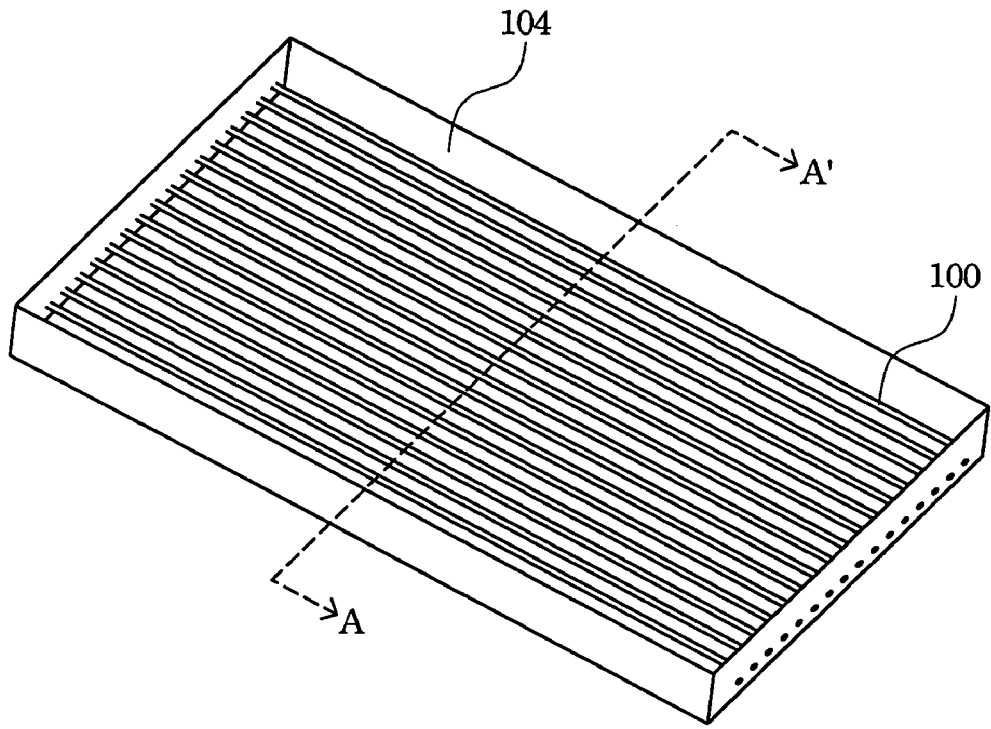
FIG. 1A illustrates a schematic top view of a conventional direct-light backlight module.
Figure 1B:
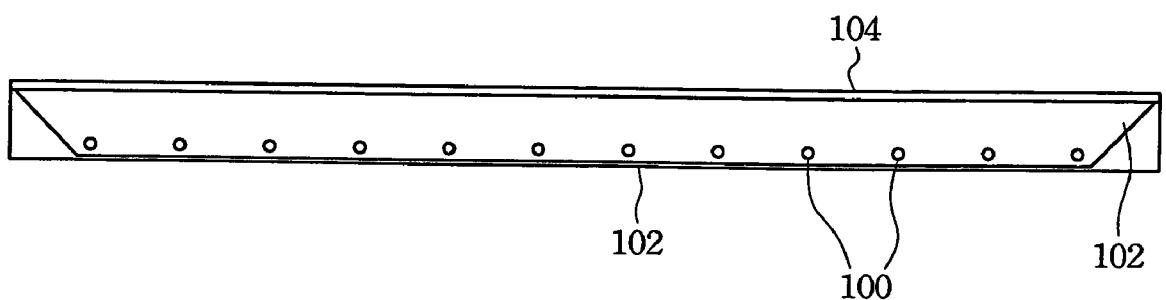
FIG. 1B illustrates a schematic cross-sectional view along the AA' line of FIG. 1A.

Without limiting the spirit and scope of the present invention, the backlight module proposed in the present invention is illustrated with one preferred embodiment. One of ordinary skill in the art, upon acknowledging the embodiment, can apply the backlight module of the present invention to various liquid crystal displays in order to improve the brightness uniformity. The present invention is explained by the following detailed embodiment. However, this embodiment does not limit the scope of the present invention.

FIG. 2A illustrates a schematic exploded view of a direct-light backlight module according to the preferred embodiment of the present invention. A plurality of reflective members 208 with ridges shape arranged in parallel is formed in a bottom plate 206. The reflective members 208 can be formed by an injection molding method. Plastic or other materials such as synthetic resin with a reflective index of 90%~100% can be used to form the reflective members 208.

A cold cathode fluorescent lamp (CCFL) 200 is situated between any two adjacent reflective members 208. The cold cathode fluorescent lamp 200 is used to provide light to a LCD panel. A light emitting diode (LED), a tungsten halogen lamp, an electroluminescent device (ELD), a cathode luminescent lamp, or a high intensity discharged lamp can also be used as the backlight. A diffuser plate 204 is located over the cold cathode fluorescent lamp 200 and the reflective members 208 so as to make the brightness uniform.

FIG. 2B illustrates an enlarged diagram of the reflective members 208 and the CCFLs 200 of FIG. 2A according to the preferred embodiment of the present invention. A cold cathode fluorescent lamp (CCFL) 200 is arranged between any two adjacent reflective members 208.

FIG. 2C illustrates a schematic cross-sectional view along the AA' line of FIG. 2B depicting a direct-light backlight module according to the preferred embodiment of the present invention. The light emitted from the CCFLs 200 is reflected by the reflective plate 202 and the reflective members 208. The reflected light is diffused through the diffuser plate 204 to provide a uniformly lit LCD panel. According to the present invention, additional reflective members 208 are used in this backlight module to reflect light from lamps. These reflective members 208 are situated on either side of each CCFL 200 to concentrate the light from CCFLs so as to avoid the generation of shadows in certain regions on the LCD panel.

Figure 3:
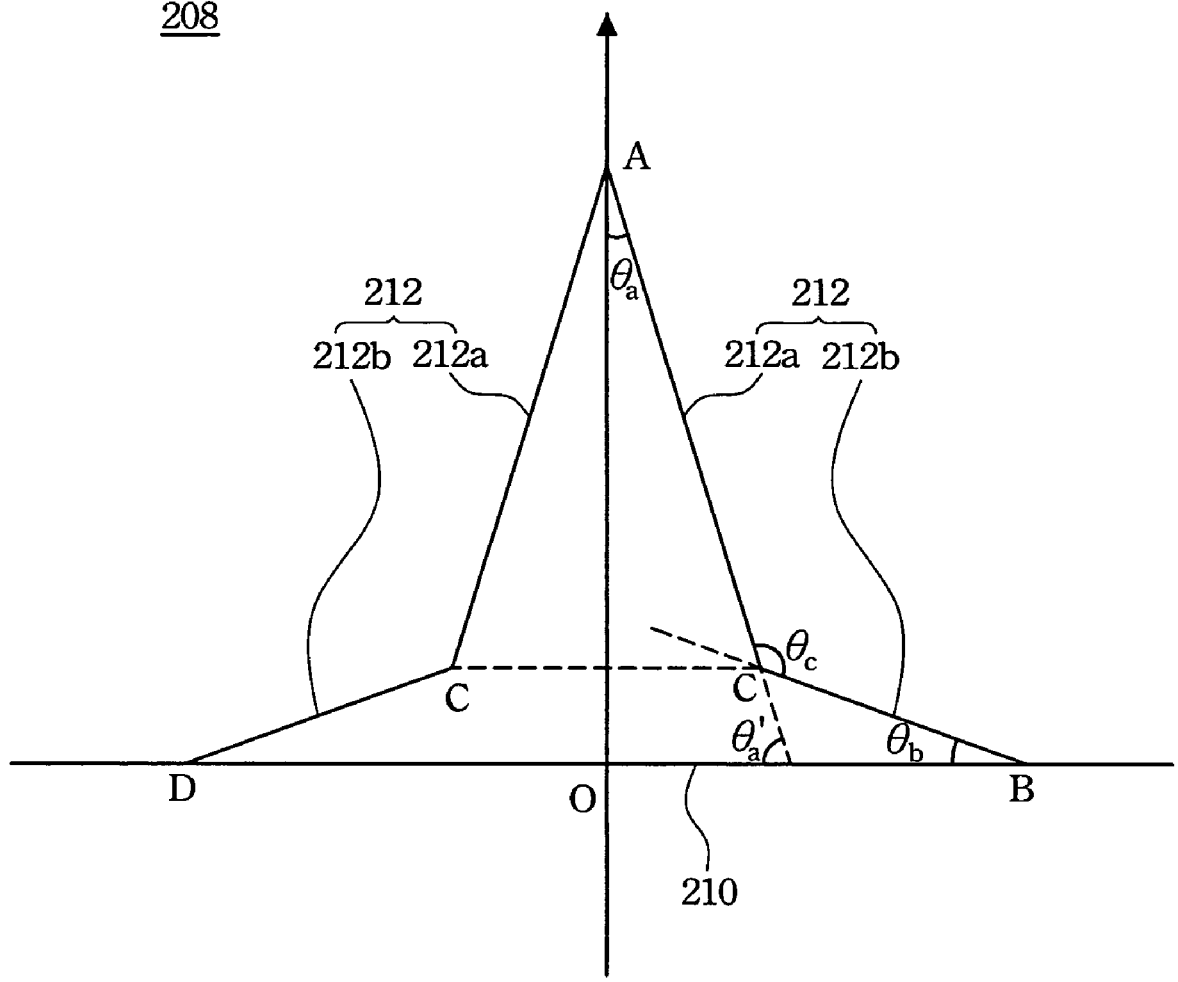
FIG. 3 illustrates an enlarged diagram of the reflective member according to the preferred embodiment of the present invention.

FIG. 3 illustrates an enlarged cross-sectional diagram of the reflective member 208 according to the preferred embodiment of the present invention. The reflective member 208 is composed of a base 210 and two sides 212, each side having an inflection point C. The two sides 212 are the same size and symmetrical about a bisector OA of the base 210. At least one inflection point C is arranged on the surface of each side 212 to divide this surface into two inclined planes 212a and 212b. In other words, the surface of each side 212 is not a single inclined plane but is composed of two differently inclined planes 212a and 212b.

An included angle $\theta_b$ exists between the base 210 and the inclined planes 212b. An included angle $\theta_a$ exists between the inclined planes 212a and the bisector OA of the base 210. An included angle $\theta_a'$ exists between the base 210 and the inclined planes 212a. According to the preferred embodiment of the present invention, the sum of the included angle $\theta_a$ and the included angle $\theta_b$ is less than 80 degrees. An included angle $\theta_C$ exists between the inclined planes 212a and the inclined planes 212b. The included angle $\theta_C$ is between 90 degrees and 170 degrees. The included angle $\theta_a'$ is greater than the included angle $\theta_b$ and less than 90 degrees. The difference between the included angle $\theta_a'$ and the included angle $\theta_b$ is not less than 10 degrees.

The foregoing description is only a preferred embodiment of the reflective member of the present invention. It is noticed that the surface of each side 212 can be composed of a plurality of inclined planes. In other words, a plurality of inflection points can exist on the surface of each side 212. The reflective members 208 can be formed by an injection molding method. Plastic or other materials such as synthetic resin with a reflective index of 90%~100% can be used to form the reflective members 208. Moreover, the reflective member can also be formed by assembling multiple parts. For example, a trapezoidal prism DBCC can be formed first. Then, a triangular prism ACC can be formed over the trapezoidal prism DBCC such that they are joined at the surface indicated by the dotted line CC.

According to the backlight module in the present invention, a plurality of reflective members is used in this module to reflect light from lamps. Each lamp is arranged between any two adjacent reflective members. These reflective members are respectively arranged between any two adjacent lamps. The reflective members can concentrate the light to avoid the generation of shadows in specific regions on the LCD panel.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A backlight module, comprising:
   a plate;
   a plurality of reflective members arranged in series over said plate, wherein each said reflective member is composed of a first and a second sidewalls; and
   a plurality of lamps respectively arranged between any two adjacent reflective members for providing light, wherein each of said sidewalls comprises a first reflective surface of a first elevation and a second reflective surface of a second elevation, and wherein said first elevation is greater than said second elevation and less than 90 degrees.

2. The backlight module of claim 1, wherein the difference between said first elevation and said second elevation is not less than 10 degrees.

3. The backlight module of claim 1, wherein said backlight module further comprises a diffuser plate located over said reflective members and said lamps.

4. The backlight module of claim 1, wherein said first sidewall and said second sidewall are symmetrical to each other.

5. The backlight module of claim 1, wherein an included angle between said first and second reflective surfaces is between 90 degrees and 170 degrees.

6. The backlight module of claim 1, wherein said lamp are selected from a group of cold cathode fluorescent lamps, light emitting diodes, tungsten halogen lamps, electroluminescent devices (ELDs), cathode luminescent lamps and a high intensity discharged lamps.

7. The backlight module of claim 1, wherein said reflective member is formed by an injection molding method.

8. The backlight module of claim 1, wherein said reflective member is made of plastic.

9. The backlight module of claim 1, wherein said reflective member is made of the material with a reflective index of 90%~100%.

10. The backlight module of claim 1, wherein said reflective member is formed by assembling multiple parts.

11. A method for forming a backlight module, comprising:
    providing a plate;
    forming a plurality of reflective members arranged in series over said plate, wherein each said reflective member is composed of a first and a second sidewalls; and
    forming a plurality of lamps respectively between any two adjacent reflective members for providing light, wherein each of said sidewalls comprises a first reflective surface of a first elevation and a second reflective surface of a second elevation, and wherein said first elevation is greater than said second elevation and less than 90 degrees.

12. The method of claim 11, wherein the difference between said first elevation and said second elevation is not less than 10 degrees.

13. The method of claim 11, wherein said method further comprises forming a diffuser plate located over said reflective members and said lamps.

14. The method of claim 11, wherein said first sidewall and said second sidewall are symmetrical to each other.

15. The method of claim 11, wherein an included angle between said first and second reflective surfaces is between 90 degrees and 170 degrees.

16. The method of claim 11, wherein said lamp are selected from a group of cold cathode fluorescent lamps, light emitting diodes, tungsten halogen lamps, electroluminescent devices (ELDs), cathode luminescent lamps and a high intensity discharged lamps.

17. The method of claim 11, wherein said reflective member is formed by an injection molding method.

18. The method of claim 11, wherein said reflective member is made of plastic.

19. The method of claim 11, wherein said reflective member is made of the material with a reflective index of 90%~100%.

20. The backlight module of claim 1, wherein each said reflective member is a bar shaped structure.

21. The backlight module of claim 1, wherein there is an interval between any two adjacent reflective members.

22. The backlight module of claim 21, wherein said intervals between two adjacent said reflective members are the same with each other or not all the same.

23. The backlight module of claim 21, wherein said reflective member, said first reflective surface and said second reflective surface are formed integrally.

24. The backlight module of claim 1, wherein said reflective members are located with parallel to each other.

* * * * *